UNITED STATES PATENT OFFICE.

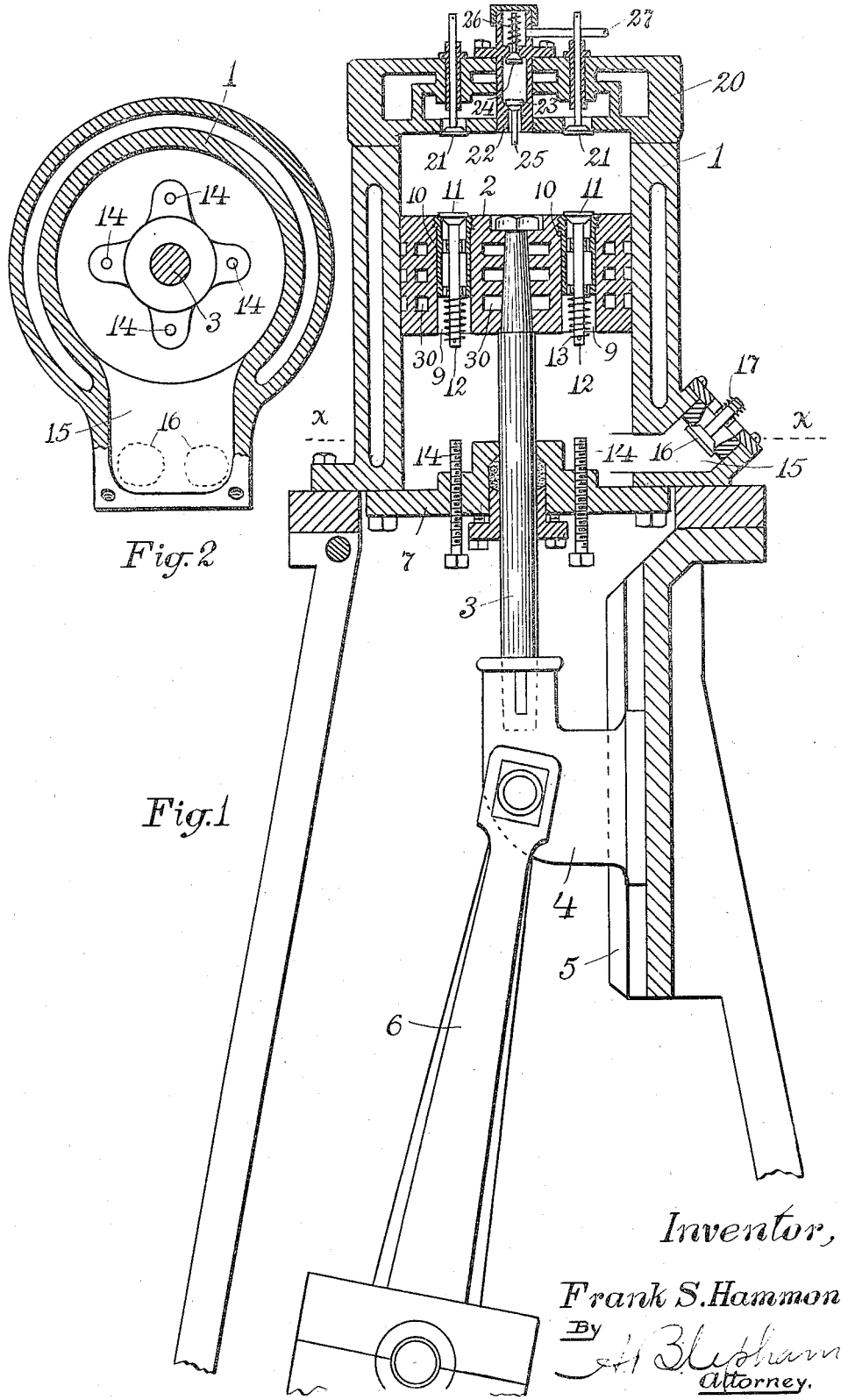

FRANK S. HAMMOND, OF CLEVELAND, OHIO.

INTERNAL-COMBUSTION ENGINE.

1,293,766. Specification of Letters Patent. Patented Feb. 11, 1919.

Application filed December 19, 1917. Serial No. 207,924.

*To all whom it may concern:*

Be it known that I, FRANK S. HAMMOND, a citizen of the United States, and a resident of Cleveland, in the county of Cuyahoga and State of Ohio, have invented certain new and useful Improvements in Internal-Combustion Engines, of which the following is a full, clear, and exact specification.

The object of this invention is the construction of an improved two-cycle engine of the Diesel type, the improvements relating to improvements in details of construction hereinafter set forth.

In the drawings forming part of this specification, Figure 1 is a central vertical section of an engine embodying my improvements. Fig. 2 is a horizontal section on the dotted line X—X in Fig. 1.

The reference numeral 1 designates the cylinder of the internal combustion engine; 2 the piston head; 3 the piston rod whose outer end is fastened in a block 4 slidable in ways 5, and 6 is a pitman for connecting the sliding block with the crank shaft.

Instead of having the piston adapted for compressing the air in the crank case as is usually done, I close the cylinder's lower end with a cylinder-head 7 through which the piston rod reciprocates, suitable packing being provided therefor. When the charge is exploded and the piston head descends, the air between the latter and the cylinder head is strongly compressed. To deliver this compressed air to the upper part of the cylinder, I provide valve-controlled ports vertically through the piston head, adapting them to be automatically opened when the piston head reaches the end of its down stroke.

In the construction of these ports, I prefer to form the piston head with as many vertical holes 9 as there are to be ports, preferably four, and to screw into each a tubular casing 10 carrying a valve 11 whose elongated stem 12 is slidably supported by the casing. These valves co-act with the upper ends of the casings 10 for the latter's closure by gravity and springs 13.

For automatically opening these valves, the cylinder head 7 is provided with an equal number of vertical bolts 14 in alinement therewith, whereby the valve stems are met and held up while the head 2 descends a short distance farther, thereby opening the ports at the proper moment. It is, of course, possible to have the valves so adjusted that the maximum air-pressure beneath the piston head will open them, but they would close as soon as the maximum pressure had been reduced by the escape of only a small portion of the compressed air, and thereby fail to deliver the proper amount of air through the piston head. The illustrated positive actuation of the valves is consequently the only practical method.

By turning the bolts 14 up, the length of time during which the valves remain open is increased, and vice versa, so as to enable the quantity of air delivered to be suitably varied.

For inhaling air during the up-stroke of the piston, a valve-controlled intake port 15 is formed radially through the cylinder close to its lower end. The valve or valves 16 normally held closed by light springs 17, are disposed to open as the piston head rises and to permit the desired supply of air to rush in beneath the piston head.

The upper cylinder head 20 is provided with exhaust valves 21 mechanically operated in a well known manner, and preferably positioned in alinement with the valves 11.

Centrally located in the cylinder head 20 is the port for the delivery of the liquid fuel. For this purpose a cylindrical casing 22 is inserted vertically through the head, and fastened air-tight therein. In this casing are located two valves 23, 24 operative in opposite directions. The valve 23 has its stem 25 hanging downward and projecting a short distance below the under surface of the head 20, so that when the piston head 2 rises to its uppermost position, it engages the stem and opens the valve. Above the valve 23 is the valve 24 kept normally in its upper and closed position by a spring 26, and above this valve a pipe 27 feeds in the liquid fuel under pressure.

When the piston head 2 reaches the upper end of its stroke, the valve 23 is opened and a quantity of hydrocarbon is jetted into the space above the head. The compression of the air having generated a high degree of heat, the hydrocarbon ignites and rapidly burns in the compressed atmosphere, forcing the piston downward with great energy. The instant the piston head descends, the valve 23 closes and no more fuel can enter. Before this, however, the explosive force of the fuel's combustion has thrown the valve 24 up into its closed position, so that both from the moment of the explosion and until the piston head descended to its lowermost position and has then returned into engagement with the valve stem 25, no more fuel can enter the cylinder.

The operation of the engine is as follows: The charge having been ignited above the piston head, the latter is forced downward to the lowermost limit, thereby communicating the desired motion to the crank shaft, and at the same time compressing to a small volume the air between it and the cylinder head 7. At this limit, the bolts 14 open the valves 11 and the compressed air instantly rushes through the ports to the space above the piston head, driving out before it the products of combustion, through the ports in the head 20, these ports being timed to be properly opened by suitable mechanism in a well known manner.

Because of the mushroom form of the valves 11, the air rising through the ports 10 is diverted laterally somewhat and thereby insures its engagement beneath the entire body of exhaust, and the complete expulsion of the latter. As soon, therefore, as practically all the exhaust has been expelled and the space above the piston head filled with pure air, the momentum of the flywheel causes the piston head to rise and this air to be compressed. This compression is made greater than its former compression beneath the piston head, since the head 2 does not approach as close to the cylinder head 7 as it does to the upper head 20, and this final compression is adapted to be such that the heat generated thereby will ignite the fuel oil entering through the port 22.

In former types of two-cycle engines, wherein the air is compressed in the crank chamber, the amount of compression is comparatively slight. Consequently, the passage thereof to the upper end of the cylinder is slow and the scavenging incomplete and inefficient. In my form of engine, on the other hand, the compression can be made to any degree found most practical, and of such an amount as will render the air transference exceedingly rapid, and the scavenging practically perfect. This renders my engine capable of a much higher speed than are the other engines, as well as far more powerful, since the fuel oil is always supplied with an ample amount of air for complete oxidation, instead of air intermixed with dead gases. Of course, the greater primary compression of the air causes a loss of power therefor, but this loss is considerably more than compensated for by the increased speed and energy of the explosions.

In order to secure sufficient length for the valve stems in order that they shall operate efficiently, the piston head must be made comparatively thick; and to both keep it from being too heavy, as well as to render it a lessened conductor of heat, it is made chambered as shown in Fig. 1. These spaces are made numerous and small in order to more perfectly interfere with the passage of heat from the combustion side to the air-compressing side. Preferably these chambers 30 are disposed in horizontal tiers, the better to accomplish the desired function.

What I claim is:

An internal combustion engine comprising a cylinder having a head, a piston head movable in the cylinder, and a pitman connected with the piston head, the cylinder head having a port for the admission of the fuel oil into the cylinder, and the port having two valves, one of which resists the expulsion of gases from the cylinder and the other of which resists the admission of the fuel oil to the cylinder, the latter valve having a stem adapted to be engaged by the piston head and be thereby made to open the valve.

In testimony that I claim the foregoing invention, I have hereunto set my hand this 10th day of November, 1917.

FRANK S. HAMMOND.